Oct. 20, 1936.   F. L. SHELOR   2,057,796
FLUID PRESSURE CONTROL BRAKING MECHANISM
Original Filed May 15, 1933
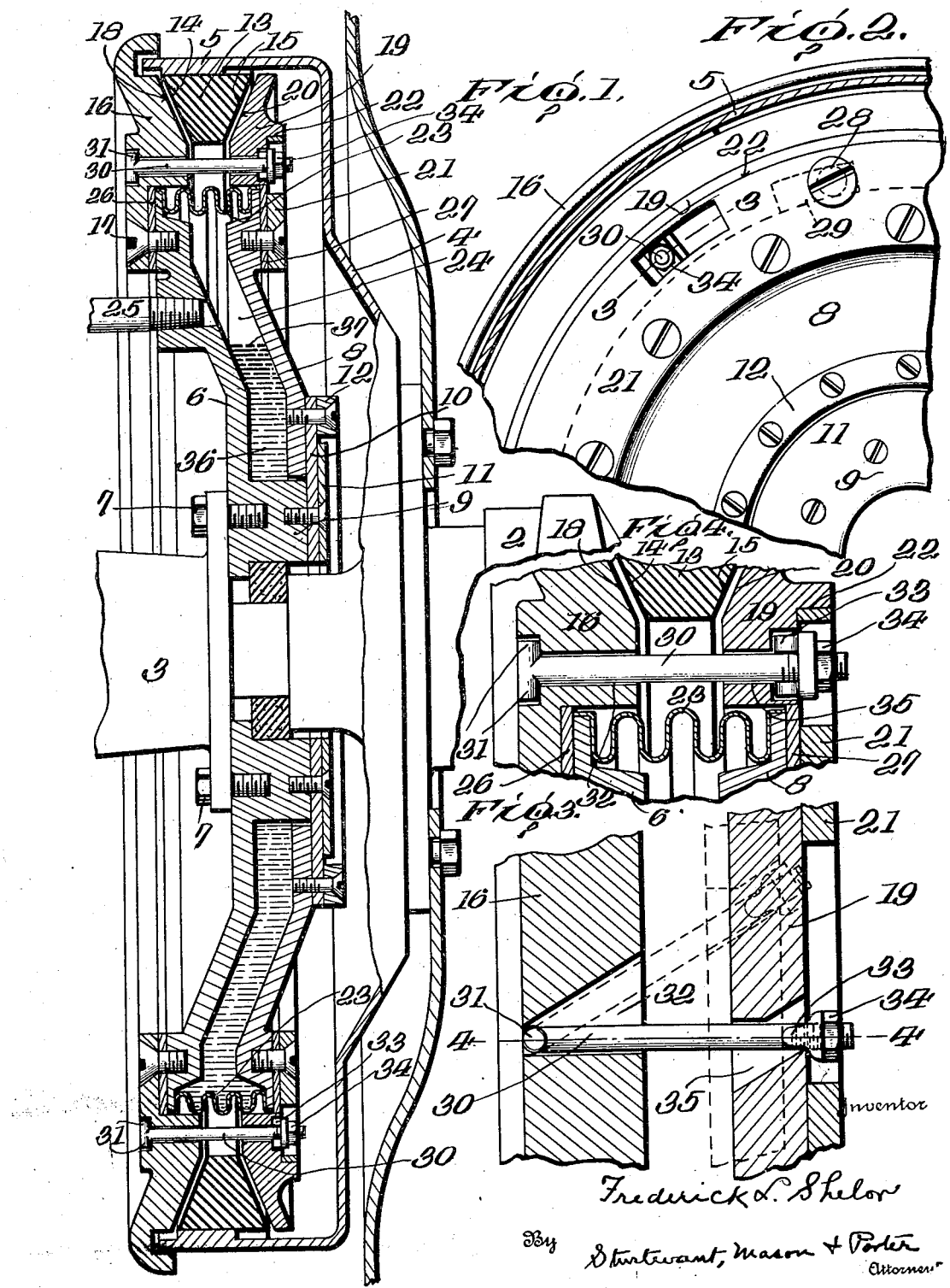
Frederick L. Shelor
By Sturtevant, Mason & Porter
Attorneys Patented Oct. 20, 1936

2,057,796

UNITED STATES PATENT OFFICE 2,057,796

FLUID PRESSURE CONTROL BRAKING MECHANISM

Frederick L. Shelor, Richmond, Va., assignor to Innovation Brakes, Inc., Richmond, Va., a corporation of Virginia Application May 15, 1933, Serial No. 671,207
Renewed February 19, 1936

8 Claims. (Cl. 188—72)

The invention relates to new and useful improvements in a braking mechanism for a motor vehicle. In my co-pending applications Serial Nos. 572,705, filed November 2, 1931, now Patent No. 1,948,190, issued February 20, 1934 and 652,389, filed January 18, 1933, there is shown and described a braking mechanism for the wheels of a motor vehicle wherein spaced disks, one of which is non-rotating, are movable relative to each other in a direction axially of the wheel for bringing the brake shoes into contact with the braking member carried by and moving with the wheel. These disks are connected by flexible members so as to form therebetween a vacuum chamber.

An object of the present invention is to provide a braking mechanism of the above type wherein the space which must be put under vacuum is reduced to a minimum without reducing the effective area of atmospheric pressure operating to move the disks relative to each other and apply the brake shoes to the braking member.

A further object of the invention is to provide a braking mechanism wherein the disks are connected by resilient members forming a closed vacuum chamber between the disks, permitting said disks to move relative to each other and operating to force the disks apart when the chamber therebetween is at atmospheric pressure.

A still further object of the invention is to provide a braking mechanism of the above type wherein one of the brake shoes is mounted for lateral and circumferential movement on the disk supporting the same, and wherein said brake shoes are interconnected by links which operate to force the brake shoes into contact with the braking member movable with the wheel when said brake shoes are turned relative to each other radially of the wheel through the friction grip of the movable brake shoe on the braking member.

These and other objects will in part be obvious and will in part be hereinafter more fully disclosed.

In the drawing—

Figure 1 is a vertical sectional view through a portion of a vehicle wheel showing the improved braking means applied thereto;

Fig. 2 is a view in section through the drum and showing the braking means in side elevation as viewed from the outer side of the wheel;

Fig. 3 is a sectional view on the line 3—3 of Fig. 2, and

Fig. 4 is a sectional view on the line 4—4 of Fig. 3.

The invention as illustrated is applied to the wheels of a motor vehicle, but it will be understood that it may be used in other ways with motor vehicles and with other rotating members. Attached to the wheel is a drum carrying a braking member which is mounted thereon so that it is shiftable axially of the wheel, but turns circumferentially with the drum. Associated with this braking member are two disks, one of which is fixed to the chassis so that it is immovable thereon, and the other of which is mounted so that it can shift laterally of the wheel, but is held from turning movement relative to the disk with which it is associated. Connecting these disks is a corrugated metal strip which is joined to the disks so as to close the space between the disks, thus forming a chamber which may be put under vacuum. Fixed to one of the disks is a brake shoe. Mounted on the other disk for circumferential movement thereon is a brake shoe, and this brake shoe has no lateral movement relative to the disk on which it is mounted. Connecting the two brake shoes at intervals are links having pivoted heads, so that the links may swing in a circumferential direction. When the chamber is put under vacuum, the movable disk will carry its associated brake shoe into contact with the braking member and force the braking member into contact with the brake shoe on the fixed disk. The frictional grip of the brake shoe mounted for circumferential movement will cause said brake shoe, through the swinging of the links, to be drawn into firm gripping contact with the braking member. A pipe leading from the chamber between the disks and connected to a vacuum creating means is connected thereto at a point adjacent the upper ends of the disks. The chamber between the disks is filled with a liquid to a point a slight distance below the pipe so that when the movable disk shifts and reduces the space containing the liquid, it will not be caused to overflow into the suction pipe. This liquid reduces the space which must be put under vacuum, and very greatly decreases the time necessary for applying the brake shoes to the braking member.

Referring more in detail to the drawing, the invention is shown as applied to a motor vehicle wheel of the disk type, and the body of the wheel is indicated at 1. The outer hub is indicated at 2 and the axle housing is indicated at 3. Attached to the wheel is a brake drum 4 having an overhanging flange 5. These features are all of the usual construction and further description thereof is not thought necessary.

Attached to the axle housing 3 is a disk 6. Said disk is secured to the housing by suitable bolts 7, 7. This fixes the disk 6 so that it is stationary with the axle housing, and has no lateral movement relative to the wheel or circumferential movement relative to the axis of the wheel. Associated with the disk 6 is a disk 8 having an opening therethrough adapted to receive the hub 9 of the disk 6. A flexible member 10 joins the disk 8 to the hub 9. Said flexible member 10 is secured to the hub 9 by a plate 11 and is secured to the disk 8 by a clamping ring 12. This disk 8 can move laterally relative to the disk 6, but it has no circumferential movement relative to the disk 6. Said disk 8 may be keyed to the hub 9 or otherwise restrained from radial movement relative to the disk 6.

Attached to the flange 5 of the brake drum is a braking member 13 which may be of any suitable material. Said braking member is provided with inclined braking surfaces 14 and 15. This braking member is attached to the drum so that it turns with the drum, but it also has a lateral movement on the drum. This is accomplished by suitable interengaging lugs and recesses formed on the drum and the braking member.

Attached to the disk 6 is a brake shoe 16. The brake shoe 16 is fixed to the disk by clamping bolts 17. This brake shoe is provided with an inclined braking face 18 which is adapted to make contact with the braking face 14 on the braking member 13. Carried by the disk 8 is a brake shoe 19 having a braking face 20 which is adapted to make contact with the braking surface 15 on the braking member 13. The brake shoe 19 is in radial alinement with the disk 8 and is supported thereon by a plate 21 which overlies the brake shoe at its peripheral edge. This plate 21 terminates adjacent a shoulder 22 on the brake shoe 19 and the brake shoe while supported on the disk and the plate is free to turn circumferentially on these supporting members. Any lateral movement of the disk 8 to the left, as viewed in Fig. 1, will, however, force the brake shoe 19 into contact with the braking member 13.

Connecting the outer ends of the disks 6 and 8, is a corrugated sheet metal member 23 which is preferably formed of copper and is analogous to a sylphon bellows. This member extends all the way around the disks, and closes the space between the disks at the outer side thereof, thus forming a chamber 24 which can be placed under vacuum. The metal member 23 is secured in any suitable way to the disks in order to provide a tight joint therebetween. Attached to the disk 6 is a pipe 25 which leads to a vacuum creating means. Said pipe is preferably joined to a suitable header and the header to the intake manifold through a control valve mechanism so that the degree of vacuum on the chamber 24 may be varied for thus creating a differential pressure on opposite sides of the disk 8, which is variable at the will of the operator. When the chamber 24 is placed under vacuum, then the disk 8 will be moved toward the disk 6, and this will cause the brake shoe 19 to contact with the braking member 13 and to force said braking member 13 into contact with the brake shoe 16, and in this manner, the braking member is gripped and retarded, thus stopping the rotation of the vehicle wheel.

Located between the disk 6 and the brake shoe 16 is a sheet of asbestos indicated at 26. Likewise, between the plate 21 and the disk 8 is a sheet of asbestos 27. The purpose of this asbestos is to prevent heat transfer from the brake shoes to the disks. This heat insulation between the brake shoes and the disks forms no part of the present invention, but is shown, described and claimed in my co-pending application Serial No. 652,389.

Fixed to the brake shoe 16 are a series of pins 28. These pins extend through slots 29 in the brake shoe 19 and are provided with heads which limit the outward movement of the brake shoe 19 relative to the brake shoe 16. The brake shoe 19, is, however, free to move in a circumferential direction through a limited range on these pins. Attached to the brake shoe 16 are a series of links 30. Each link is provided with laterally projecting cylindrical members 31, 31, and these cylindrical members 31, 31 rest in suitable recesses formed in the brake shoe 16. There is a recess 32 in the brake shoe 16 which permits the link 30 to swing from the full line position, shown in Fig. 3, to the broken line position. Each link extends through the brake shoe 19. Attached to the end of the link is a head 33 which is likewise provided with lugs which, at their inner faces, are circular in cross section. These lugs bear in similar shaped recesses in the brake shoe 19 and are shaped so that the head may swing from the full line position, shown in Fig. 3, to the broken line position shown therein. A nut 34 is threaded on to the end of each link and serves as an abutment for the head 33. There is a recess 35 in this brake shoe 19 which permits the brake shoe 19 to move in a circumferential direction relative to the brake shoe 16. When the brake shoe 19 moves in this circumferential direction, so as to bring the links to the inclined position indicated in the broken lines in Fig. 3, they will force the brake shoe 19 to move toward the brake shoe 16. Likewise, when the brake shoe 19 is moved circumferentially in the opposite direction, then it will move away from the brake shoe 16.

In the operation of my improved braking mechanism, the chamber 24 is placed under vacuum sufficient to create a differential pressure that will force the disk 8 laterally toward the disk 6, and this will cause the brake shoe 19 to contact with the braking member 13 and force the braking member 13 into contact with the brake shoe 16. As soon as the brake shoe 19 contacts with the braking member 13, the frictional grip therebetween will cause said brake shoe 19 to turn in a circumferential direction on the disk 8, and this will swing the links 30 to the broken line position shown in Fig. 3, which will in turn force the brake shoe 19 into a firmer grip with the braking member 13, and the braking member 13 into firmer grip with the brake shoe 16. The vacuum chamber 24 is filled with a liquid indicated at 36. The level of the liquid in the vacuum chamber, when the disks are fully separated is indicated at 37 in Fig. 1. When the disks are moved into contact with the braking member, then the vacuum chamber is decreased in size, and this will raise the level of the liquid 36 and change its form without altering its volume, but not sufficiently to cause it to flow into the suction pipe 25. When it is desired to apply the brakes, the only space from which air must be drawn and on which a vacuum is created, is the space above the liquid in the vacuum chamber 24, and therefore a vacuum may be drawn very quickly on this space. While the size of the chamber on which a vacuum must be created is reduced to a minimum, the area of differential pressure moving the disk 8 extends all the way from the outer side of the chamber 24 to the hub member 9 carried by the disk 6. In other words, whatever may be the pressure on the surface of the liquid relative to atmospheric pressure, this is transmitted through the liquid to every point where the liquid contacts with the disk 8. It is often extremely important in a motor vehicle to apply the brakes quickly, and this can be accomplished by the braking means described above, due to the fact that the volume of air necessary to be withdrawn from the vacuum chamber at the wheels is very small. The brakes will respond almost instantly to the shifting of the pedal which controls the degree of vacuum on the chambers at the wheel. Instead of a liquid, a jelly-like mass could be used, but in either case it should be a mass which is moldable, thus permitting free movement of the disks relative to each other. The liquid or moldable mass partly filling the vacuum chamber will have the further advantage of helping to keep the brakes cool. Furthermore, just as soon as the brake shoe 19 is moved sufficiently to bring about a frictional grip through its contact with the braking member 13, it will then move with the braking member 13 to a limited extent, swinging the links 30 and thus very quickly bringing into action the maximum braking pressure on the braking member which can be accomplished at the set degree of vacuum pull on the vacuum chamber. Not only will the braking members be quickly brought into contact with the braking surface, but the toggles will operate at all times to add to the pressure on the braking member in direct and in fixed proportion to the degree of vacuum on the chamber. When the degree of vacuum on the chamber 24 is increased or brought back to atmospheric pressure, then the metal plate 23 expanding will separate the disks and release the braking pressure on the braking member 13.

It is obvious that minor changes in the details of construction and the arrangement of the parts may be made without departing from the spirit of the invention as set forth in the appended claims.

Having thus described the invention, what I claim as new and desire to secure by Letters Patent, is—

1. In a braking mechanism for motor vehicles, the combination of a braking member secured to and rotatable with a vehicle wheel, spaced non-rotating disks having movement relative to each other, a brake shoe associated with each disk and adapted to grip therebetween said braking member when the disks are moved toward each other, means connecting said disks and forming therebetween a vacuum chamber, and a pipe connection through one of said disks with said chamber adjacent the upper end thereof whereby said chamber may be placed under vacuum, said chamber having a liquid therein, the level of which, when the brakes are applied, is slightly below said pipe.

2. In a braking mechanism for motor vehicles, the combination of a braking member secured to and rotatable with a vehicle wheel, spaced non-rotating disks having movement relative to each other, a brake shoe associated with each disk and adapted to grip therebetween said braking member when the disks are moved toward each other, flexible members connecting said disks and forming therebetween a vacuum chamber, said flexible members including a flexible metal member joining the outer edges of said disks, said member being constructed so as to yieldingly separate said disks, and a pipe connection through one of said disks with the said chamber adjacent the upper end thereof whereby said chamber may be placed under vacuum, said chamber having a liquid therein, the level of which, when the brakes are applied, is slightly below said pipe.

3. In a braking mechanism for motor vehicles, the combination of a braking member secured to and rotatable with a vehicle wheel, spaced non-rotating disks having movement relative to each other, a brake shoe associated with each disk and adapted to grip therebetween said braking member when the disks are moved toward each other, means connecting said disks and forming therebetween a vacuum chamber, a pipe connection through one of said disks with said chamber whereby said chamber may be placed under vacuum, one of said brake shoes being fixed to its associated disk and the other brake shoe being supported on its associated disk for circumferential movement, and links connecting said brake shoes and operating to move said brake shoes toward each other through the frictional drag of said movable brake shoe on said braking member.

4. In a braking mechanism for motor vehicles, the combination of a braking member secured to and rotatable with a vehicle wheel, spaced non-rotating disks having movement relative to each other, a brake shoe associated with each disk and adapted to grip therebetween said braking member when the disks are moved toward each other, means connecting said disks and forming therebetween a vacuum chamber, a pipe connection through one of said disks with said chamber whereby said chamber may be placed under vacuum, one of said brake shoes being fixed to its associated disk and the other brake shoe being supported on its associated disk so as to move circumferentially thereon, pins carried by one of said disks and extending through slots in the other disk, a plate carried by the disk supporting the movable brake shoe and overlying the same for forcing said brake shoe into contact with the movable member when the chamber is placed under vacuum, and means connecting said brake shoes whereby the circumferential movement of one brake shoe will force said brake shoes toward each other when said brake shoes contact with said braking member.

5. In a braking mechanism for motor vehicles, the combination of a braking member secured to and rotatable with a vehicle wheel, spaced non-rotating disks having movement relative to each other, a brake shoe associated with each disk and adapted to grip therebetween said braking member when the disks are moved toward each other, flexible members connecting said disks and forming therebetween a vacuum chamber, said flexible members including a flexible metal member joining the outer edges of said disks, said member being constructed so as to yieldingly separate said disks, and a pipe connection through one of said disks with said chamber whereby said chamber may be placed under vacuum, one of said brake shoes being fixed to the disk with which it is associated and the other brake shoe having a circumferential movement relative to its associated disk, and a plate carried by said last-named disk and overlying said movable brake shoe for forcing the same into contact with the braking member when the chamber is placed under vacuum.

6. In a braking mechanism for motor vehicles, the combination of a braking member secured to and rotatable with a vehicle wheel, spaced non-rotating disks having movement relative to each other, a brake shoe associated with each disk and adapted to grip therebetween said braking member when the disks are moved toward each other, flexible members connecting said disks and forming therebetween a vacuum chamber, said flexible members including a flexible metal member joining the outer edges of said disks, said member being constructed so as to yieldingly separate said disks, a pipe connection through one of said disks with said chamber whereby said chamber may be placed under vacuum, one of said brake shoes being fixed to the disk with which it is associated and the other brake shoe having a circumferential movement relative to its associated disk, a plate carried by said last-named disk and overlying said movable brake shoe for forcing the same into contact with the braking member when the chamber is placed under vacuum, and links connecting said brake shoes, said links being pivotally connected to each brake shoe and arranged so that when said movable brake shoe contacts with the braking member and turns therewith, said links will draw said brake shoes into intimate contact with said braking member.

7. In a braking mechanism for motor vehicles, the combination of a braking member secured to and rotatable with the vehicle wheels, spaced non-rotating disks having movement relative to each other, a brake shoe associated with each disk and adapted to grip therebetween said braking member when one disk is moved toward the other, means connecting said disks and forming therebetween a vacuum chamber, a pipe connection through one of said disks with said chamber adjacent the upper end thereof whereby said chamber may be placed under vacuum, said chamber having a moldable mass therein, the level of which when the brakes are applied is slightly below said pipe and which by movement of one of said plates or disks relative to the other may change its form without changing its volume.

8. In a braking mechanism for motor vehicles, the combination of a braking member secured to and rotatable with a vehicle wheel, spaced non-rotating disks having movement relative to each other, a brake shoe rigidly attached to each disk and adapted to grip therebetween said braking member when the disks are moved toward each other, means connecting said disks and forming therebetween a chamber, a pipe connected to said chamber and adapted to be connected with a vacuum creating means, said chamber having a liquid therein contacting with said non-rotating disks and on which liquid a pressure less than atmospheric pressure may be imposed by said vacuum creating means for causing said disks to move toward each other for gripping the brake shoe.

FREDERICK L. SHELOR.